United States Patent
Flaig et al.

(12)

(10) Patent No.: US 6,488,206 B1
(45) Date of Patent: Dec. 3, 2002

(54) METHOD AND APPARATUS FOR DETECTING AND INVESTIGATING FRAUDULENT TRANSACTIONS IN DEBIT AND CHARGE CARD ACTIVATIONS

(75) Inventors: Mark S. Flaig, Germantown, WI (US); George J. Odishoo, Cedarburg, WI (US); Gary T. Shea, Bayside, WI (US); Sally A. Wojak-Puranen, Muskego, WI (US); Robert T. Clark, Saukville, WI (US)

(73) Assignee: eFunds Corporation, Milwaukee, WI (US)

( * ) Notice: Subject to any disclaimer, the term of this patent is extended or adjusted under 35 U.S.C. 154(b) by 78 days.

(21) Appl. No.: 09/694,042

(22) Filed: Oct. 20, 2000

Related U.S. Application Data (60) Provisional application No. 60/161,161, filed on Oct. 22, 1999.

(51) Int. Cl.[7] ................................................ G06K 5/00
(52) U.S. Cl. ...................................... 235/380; 235/375
(58) Field of Search ................................ 235/379, 375, 235/383, 381, 495, 449, 380; 379/265.01, 91.01, 93.03, 265, 266, 309, 113, 114

(56) References Cited

U.S. PATENT DOCUMENTS

| | | | |
|---|---|---|---|
| 5,010,485 A | | 4/1991 | Bigari |
| 5,173,594 A | | 12/1992 | McClure |
| 5,206,899 A | * | 4/1993 | Gupta et al. ................. 379/120 |
| 5,281,799 A | * | 1/1994 | McIntire et al. ............. 235/380 |
| 5,427,832 A | * | 6/1995 | Longtin ........................ 428/40 |
| 5,506,395 A | * | 4/1996 | Eppley ........................ 235/486 |
| 5,511,114 A | * | 4/1996 | Stimson et al. ............. 379/114 |
| 5,577,109 A | * | 11/1996 | Stimson et al. ............. 379/112 |
| 5,609,253 A | * | 3/1997 | Goade, Sr. ................... 206/460 |
| 5,777,305 A | | 7/1998 | Smith et al. |
| 5,884,289 A | | 3/1999 | Anderson et al. |
| 5,903,633 A | | 5/1999 | Lorsch |
| 5,907,142 A | | 5/1999 | Kelsey |
| RE36,365 E | | 11/1999 | Levine et al. |
| 5,991,411 A | | 11/1999 | Kaufman et al. |
| 5,991,750 A | | 11/1999 | Watson |
| 6,029,154 A | | 2/2000 | Pettitt |
| 6,032,136 A | | 2/2000 | Brake, Jr. et al. |
| 6,102,162 A | | 8/2000 | Teicher |
| 6,144,948 A | | 11/2000 | Walker et al. |
| 6,327,363 B1 | * | 12/2001 | Henderson et al. .... 379/265.01 |

\* cited by examiner

Primary Examiner—Thien M. Le
(74) Attorney, Agent, or Firm—Michael Best & Friedrich, LLP (57) ABSTRACT

A method and apparatus for the detection and investigation of fraudulent debit and charge card activation transactions. Cardholder information on file is matched with information provided at activation time. Where matching does not occur, fraud is a possibility. All activation activity is captured and summarized. Absolute failures are highlighted. Subsequent fraudulent use of fraudulently activated cards can be investigated resulting in possible identification of the alleged fraudulent card user.

33 Claims, 6 Drawing Sheets

This is an example of a Daily Report. Each Activation transaction is summarized with two lines of information.

Field names and explanations:

Card holder number and name identify the user of the credit or debit card.
Acct # is the Card Issuer assigned account number for the Card Holder.
Local Date/Time is when the activation transaction occurred.
Call # is unique to a session.
Caller ID is the telephone number the Card Holder called from.
Activation Criteria identifies the type of information matched against.
Activation Status says whether or not the activation was successful.
Primary Data Entered or Secondary Data Entered show what information the Card Holder entered.
Term ID indicates the Activation Agent.
FL is an eyecatcher. Where there is an asterisk, the activation failed.
In the XFER column, there will be an asterisk when interaction with the automated part of the Card Activation System was transferred to a human operator.

In this example report, for the third activation transaction, there are a high number of sessions, the Activation ended in failure, and it appears that the caller hung up before being transferred to a human operator. A Card Issuer, upon review of this report should investigate. Checking the entered data against data on file and calling the Card Holder are two reasonable course of actions.

*FIG. 6*

METHOD AND APPARATUS FOR DETECTING AND INVESTIGATING FRAUDULENT TRANSACTIONS IN DEBIT AND CHARGE CARD ACTIVATIONS

RELATED APPLICATIONS

This application claims the benefit of U.S. Provisional Patent Application No. 60/161,161 filed on Oct. 22, 1999.

BACKGROUND OF THE INVENTION

The invention relates generally to the activation of debit and charge cards. More specifically, the invention relates to a method and apparatus to monitor payment card activation activity and to detect and investigate fraudulent debit and charge card activations.

When debit and credit cards (generically referred to as "cards" or "payment cards" herein) are newly issued or reissued, they are mailed to cardholders. In most instances, the cards are mailed in an inactive state in order to prevent unauthorized use of the card by someone other than the cardholder. Typically, cards include a sticker or other label with information instructing the card recipient to contact a call center via the telephone, Internet, or other method. The person in possession of the card contacts the call center to activate the card. With existing activation systems, the cardholder must usually validate identity information to a customer representative or, in some cases an automated voice response unit. If the identity information provided by the caller matches the information at the call center, the card is authorized. In general, little information concerning the activation process is recorded and maintained. Further, no systematic or engineered devices or techniques are used to detect and prevent fraudulent activations of cards.

SUMMARY OF THE INVENTION

Accordingly, there is a need to provide a method and device to detect and investigate fraudulent activation transactions.

The invention provides an automated card activation system ("ACAS") that includes a response unit. Upon receiving a request or telephone call from a purported cardholder, the response unit generates a message, such as a voice message, instructing the purported cardholder ("PC") to interact with the system to activate the recently received card. The PC is queried for his or her card number and a predetermined amount of personal information (generally "requested criteria"). The ACAS matches the requested criteria it receives in response to the queries with information obtained earlier from the true cardholder's original card application.

The ACAS is programmed to allow the PC a predetermined number of match attempts on the requested criteria. The ACAS maintains an attempt counter, which is initialized to zero at the beginning of a session. The ACAS may be configured to test for matches of multiple criteria. For each match attempt, the ACAS logs the information the cardholder supplied and the results of the match attempt, which can be either a success or failure. The attempt counter is incremented each time a failure occurs. When all of the criteria have been met, an activation flag is set in the cardholder's record, an activation record is logged, and the cardholder is informed that his or her card has been activated.

Of course, a session with the ACAS may end in failure. If so, the card remains inactive. A pre-determined number of sessions with the ACAS are allowed. To track the number of sessions that a PC uses in an attempt to activate a card, the ACAS maintains a session counter. The session counter is initialized to zero upon the creation of the cardholder record, which typically occurs during the processing of the cardholder's application. The values of the session and attempt counter are stored in a log or other record.

If either of the counter limits are exceeded, or the PC cannot correctly provide account number information to the ACAS, the ACAS 1) transfers the PC to a human operator or customer service representative ("CSR") for assistance in activating the card, or 2) directs the PC to contact the card issuer directly. The fact that a transfer has occurred is logged. If the PC is transferred to a CSR, the representative determines whether to activate the card based on a set of criteria. This set of criteria is the same or similar to that used by the ACAS. The CSR may also use additional criteria and exercise human judgment in making an activation decision. The CSR's activation decision is also logged.

Logged records are processed on a periodic basis, for example, daily, to produce a card activation report. The records may also be processed on a second periodic basis, based on criteria such as an invoice cycle, to produce an accumulated or summary card activation report. Daily and cycle-duration reports are provided to card issuers as part of an optional, subscription card activation reporting service.

The information logged by the ACAS may be sorted in a variety of ways to produce activity reports. In one embodiment of the invention, logged records are sorted first by card issuer, then card number, then cardholder to session number, then activation agent, and finally sequence number. The activation agent is either the ACAS or the CSR. The sorted records are separated into groups, where a group is all those records associated with the same card issuer, card number, session number, and activation agent. Each group is sorted in chronological order by a sequence number.

A card activation report is built using the last record in each sorted group. In nearly all situations, the ACAS generates a group of records (as opposed to just one record) for each session because records are logged for each validation match attempt and also for final activation. The last record chronologically associated with a session has the highest sequence number. The card activation report shows detailed information extracted from the last log record. This information includes the cardholder's name, the card number, the session number, the activation agent, the personal information that was entered on the last match effort, an indication of whether the call was transferred, and an indication of whether activation was successful. The report includes a flag or other eye-catcher (such as an asterisk). The presence of a failure flag indicates an absolute failure. That is, for the subject cardholder number, on the subject day, no card was activated and there was at least one failed activation attempt. The report also summarizes the number of successful and unsuccessful sessions by the criterion (or activation method) last employed. A card activation report can be developed for each card issuer that subscribes to the ACAS.

In the case of successful activations, the report includes the last triggering action (or match). In the case of a failure during a session, facts about the last match effort are shown in the report. These facts include information that was provided to the ACAS by the PC. The ACAS include a log-viewing or user/administrative interface module that provides access to all logged information stored in the ACAS.

As is apparent from the above, it is an advantage of the present invention to provide a method and system of activating payment cards. Other features and advantages of the present invention will become apparent by consideration of the detailed description and accompanying drawings.

DETAILED DESCRIPTION

Before one embodiment of the invention is explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Figure 1:
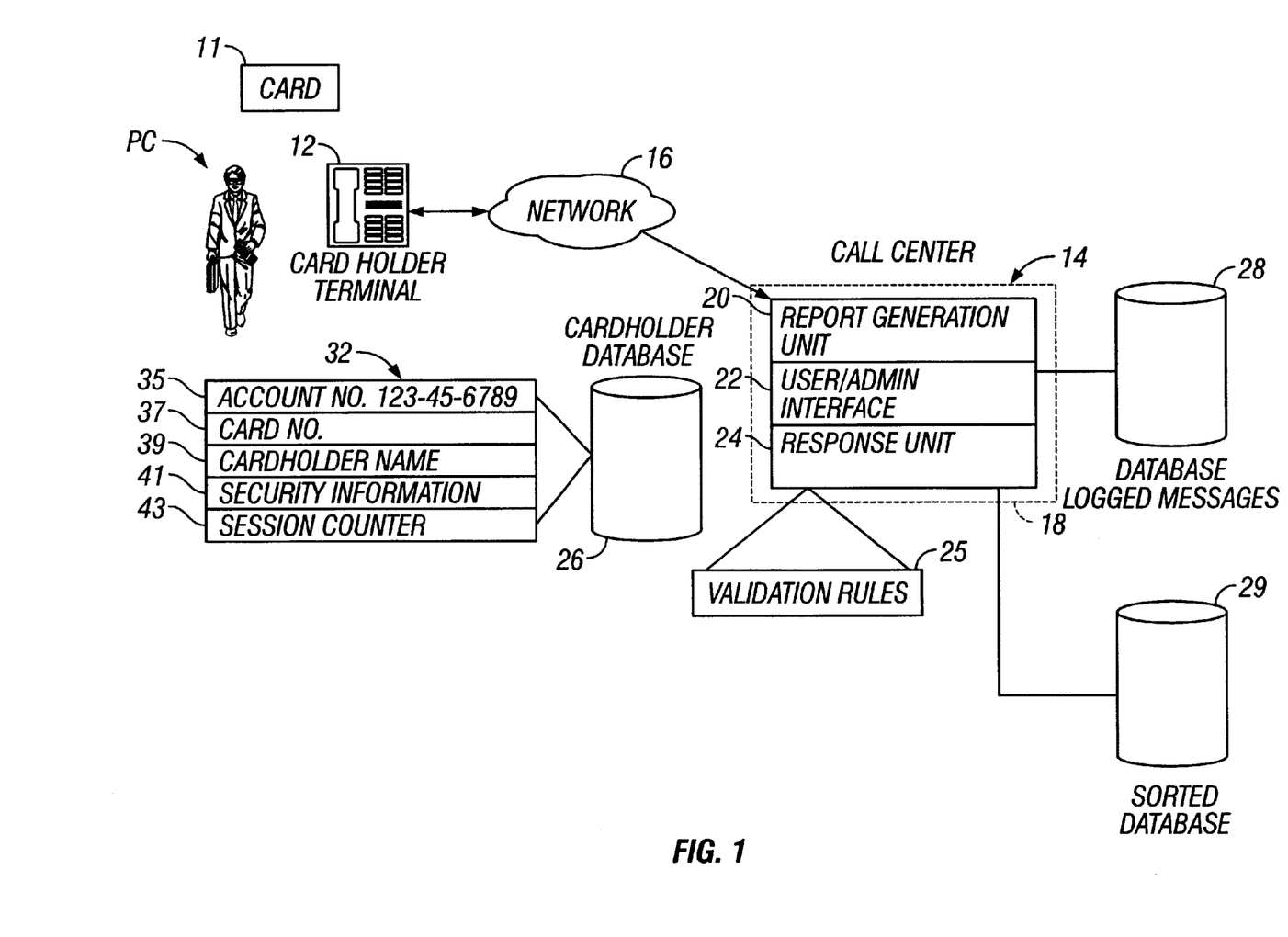
FIG. 1 is a schematic diagram of a system of the invention.

An automated card activation system ("ACAS") 10 of the invention is shown in FIG. 1. The system 10 is designed to be used by financial institutions that issue payment cards or by service organizations that provide activation services to such institutions. The system may be accessed by a user or purported cardholder ("PC") who has obtained possession of a card 11. The system 10 includes a cardholder terminal 12 that may be a telephone, computer, Internet appliance, personal digital assistant, or the like. The cardholder terminal 12 is coupled to a call center 14 through a network 16, such as the public switched telephone network (an instance of a "circuit-switched network"), the Internet (an instance of a "packet-switched network"), or other network. The call center 14 includes one or more computers or other programmable devices, generically identified as a processor 18, it being understood that multiple servers, a client and a server, and other hardware configurations could suitably support the software of the invention. The processor 18 could be a web server and include a web site with HTML or other content having a defined set of tags. Preferably, the call center includes, in software form, a report generation unit 20, a user/administration interface module 22, and a response unit 24. The response unit includes or is associated with a set of validation rules 25. The rules 25 are used by the response unit 24 to analyze the responses and information provided by the PC. The validation rules 25 are set by the card issuer. Generally, validation rules are set for groups of cards, according to relatively standardized procedures, at a bank identification number ("BIN") level. The processor interacts with a cardholder database 26 and a message database 28. The message database 28 may be accessed by the report generation unit 20 and the information therein may be sorted to create a sorted database 29.

A call or other request initiated by the caller or purported cardholder ("PC") to the system 10 at the terminal 12 is answered at the call center 14 by the response unit 24. Because it is possible that a fraudulent user or imposter will attempt to activate the card, the system 10 treats all attempts as being made by a potential imposter. As will be discussed in greater detail below, the response unit generates queries to the PC, requests look-ups (i.e., analyzes the responses made to the queries) and writes information, such as an activation event and other activation session activity, to the database of messages 28. Each message logged in the database 28 is assigned a sequence number so that a chronological sequencing of events that occur during a session may be maintained. The response unit 24 also generates results messages, such as activation successful or activation failure messages, and sends them to the terminal 12 for reception by the PC. The call center 14 maintains validation criteria in the cardholder database 26. The cardholder database is populated with information obtained from cardholder applications by the institution issuing the payment card that is the subject of the activation attempt. The cardholder database includes a number of cardholder records 32 (only one of which is shown). Each record 32 includes an account number 35, a card number 37, a cardholder name 39, and security information 41. The cardholder record 32 also includes a session counter 43, which is initially set to zero, incremented with each session started by the system 10 for that particular record, (and reset to zero after a successful activation). The report generation unit 20 sorts the logged records in the database 28 and creates reports from those records. Logged records can also be searched and read using the user/administration interface 22.

Figure 2:
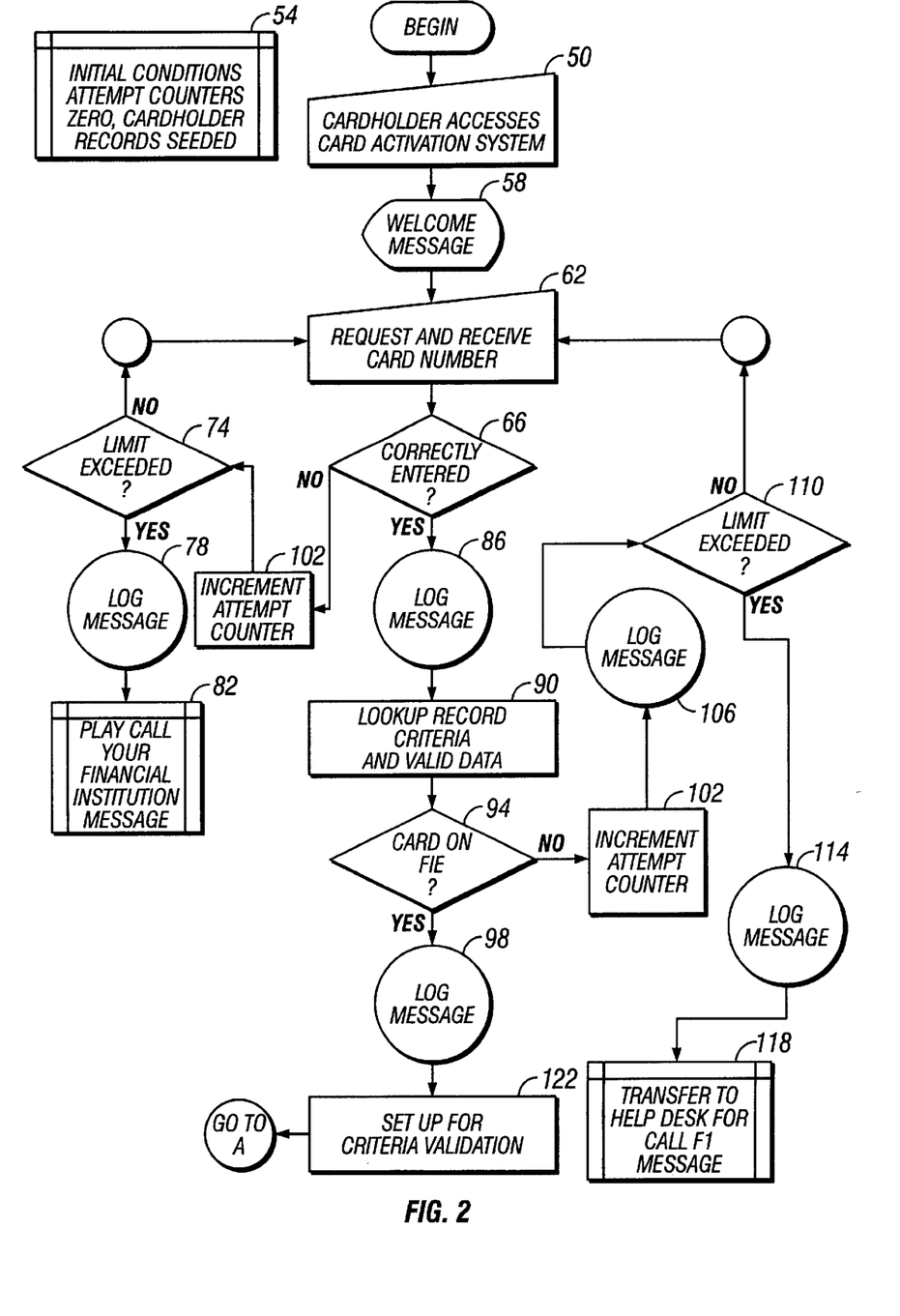
FIG. 2 is a flowchart of part of the activation process of a card.
Figure 3:
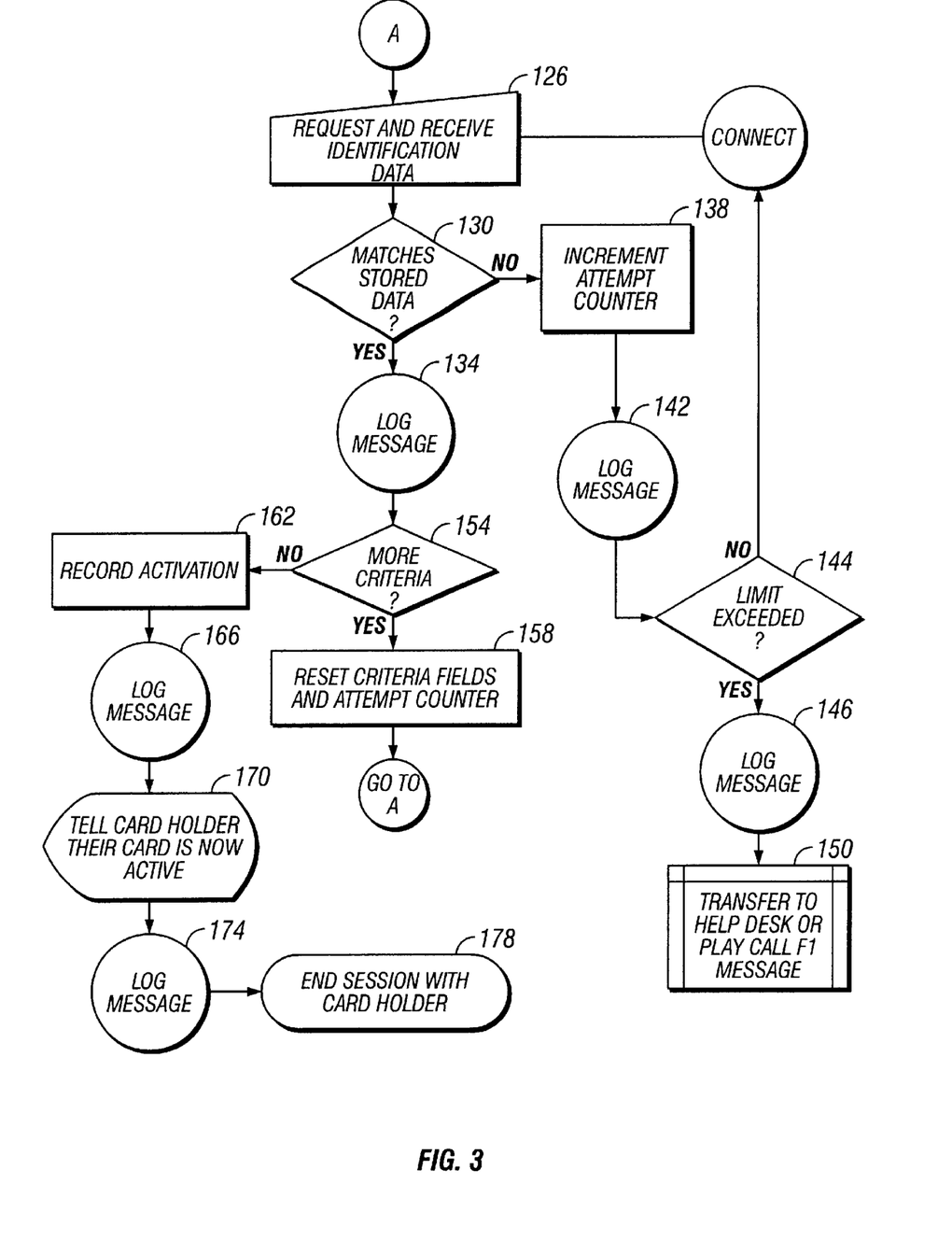
FIG. 3 is a flowchart of part of the activation process of a card.

The process of activating a card as carried out by the system 10 is shown in FIGS. 2 and 3. A shown at step 50, the receipt of a call at the call center 14 activates the system 10 and marks the beginning of a session. The processor 18 initializes various variables or objects, as shown at step 54. The objects used by the system include tracking mechanisms in the form of the session counter 43 and a number of attempt counters that are discussed below. In general, various information is garnered from the PC and is compared to that in the database 26.

Following initialization, the system 10 generates a welcome message, as shown at step 58. The system 10 queries the PC for a card number and then reads the card number entered by the PC, as shown at step 62. The system 10 then checks, at step 66, the entered card number to ensure that it falls within allowable parameters for card numbers. For example, if the system knows that card numbers should include 16 digits, a card number of more or less digits will not be accepted. If an unacceptable card number is entered, a card number counter is incremented at step 70. The system 10 then checks to see if the card number counter exceeds a predetermined limit, such as 3 attempts, at step 74. If the limit is exceeded, the system 10 logs a card number exceeded message in the database 28, as shown at step 78. The system then plays or generates a message indicating an attempt failure. The message may contain additional information instructing the PC to contact his or her financial institution for assistance in activating the card 11. As long as the card number counter limit is not exceeded, the system 10 continues to ask the PC to enter a new card number.

When an allowable card number is entered, the system 10 logs relevant information about the activation request or lookup, as shown at step 86. This information includes the card number provided by the PC, an automatic number identifier (ANI) generated by the system 10 for the PC, any card issuer information that can be derived from the card number, and the date and time of the session. A look-up is performed at step 90. The system checks, at step 94, whether the card number is on file in the database 28. If the card number matches one of the records 32, validation data and rules are logged along with all other information that has been collected by the system 10, as shown at step 98. If the card number does not match any card number on file, the system increments a card number match counter, as shown at step 102. A message concerning a failure to find a match is logged at step 106 and the system then checks to see if the card number match counter limit has been exceeded, as shown at step 110. If the counter limit has not been exceeded, the system 10 re-executes step 62 and the PC is asked to enter a new card number. If the card number match counter limit is exceeded, a failure message is logged, as shown at step 114, and an appropriate message is generated and sent to the terminal 12, as shown at step 118. The message may ask the PC to contact his or her financial institution for assistance with activating the card. Alternatively, the PC may be transferred to a help desk or CSR.

If a matching card number is entered by the PC, the system 10 begins the validation process as shown at step 122. The response unit 24 sends a query to the terminal 12 requesting identification information from the PC and reads the response data entered by the PC at the terminal 12, as shown at step 126. The system 10 may be configured to request a variety of identification information, such as the cardholder name, a pin number, the maiden name of the cardholder's mother, a password, and the like. The response entered by the PC is compared to information stored in the record 32, as shown at step 130. If the information matches, a match message is written to the database 28, as shown at step 134. If the information does not match, an identification counter is incremented, as shown at step 138, an appropriate message is logged at step 142, and a check is made to see if the identification counter has exceeded a predetermined limit at step 144. If the limit is exceeded, a counter-exceeded message is logged at step 146, and an appropriate failure message is sent to the terminal 12, as shown at step 150. Alternatively, the PC could be transferred to an operator or help desk for assistance with validating his or her card. If the limit of the identification counter is not exceeded, the system re-executes step 126 and the PC is again requested to enter identifying information.

As noted above, the system may ask the PC for a variety of identification information. The system may be configured to make repeated requests and checks of identification information depending on the level of security deemed necessary by the card issuer. If additional identification information is to be evaluated, the system 10 checks at step 154 whether there is more criteria to check. If so, the criteria fields and identification counter are reset at step 158. Step 126 is then repeated.

Once all the criteria or identification information is successfully validated, the system activates the record 32 associated with the card being validating by the PC, as shown at step 162. An activation record is then logged at step 166. A message is sent to the terminal at step 170 and a record of sending the activation message is logged at step 174. Finally, the session is ended at step 178.

As should be apparent from the above description, the system 10 records numerous events throughout the validation process. These events include successful attempts and activations. Of course, system failures may also occur, although they are not shown in FIG. 1 or 2. When a system failure occurs, the system 10 informs the caller of the failure, if possible. The system 10 also plays or sends a message requesting the PC to try validating the card again later.

Figure 4:
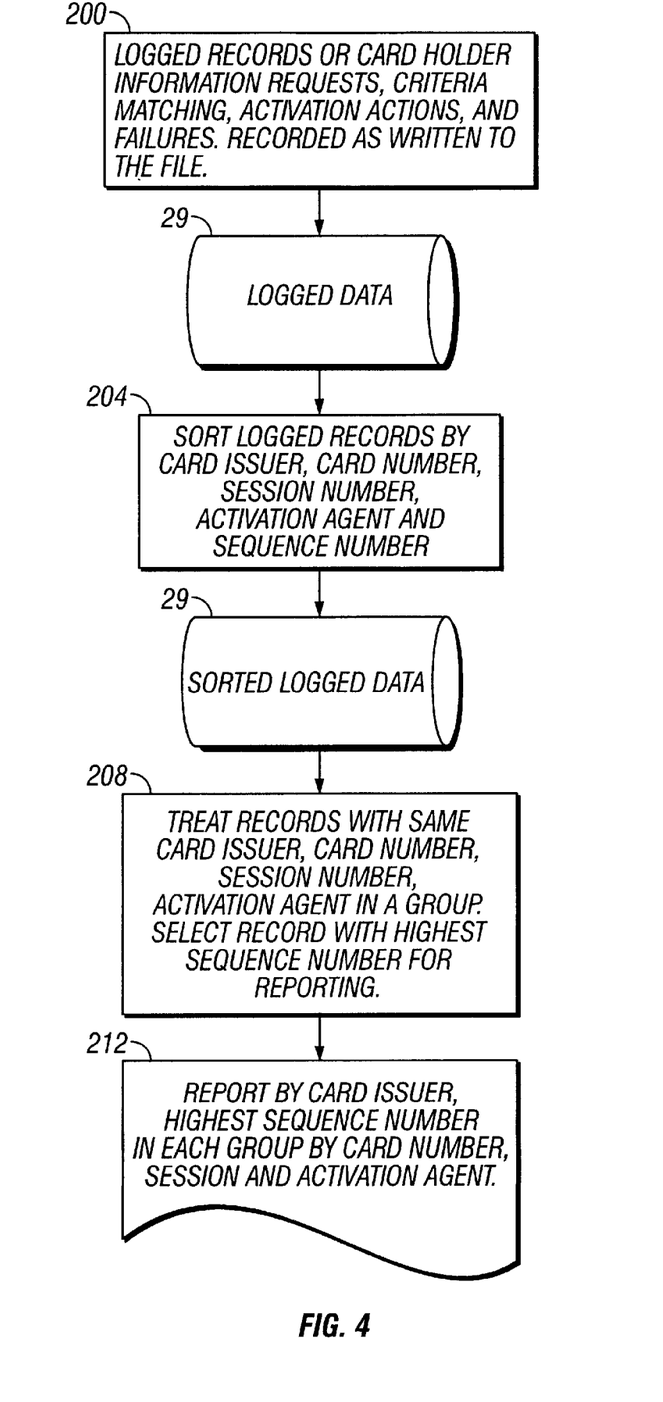
FIG. 4 is a flowchart of the process of selecting records for a card activation report.

The records created as a result of recording the events that occur during the validation process can be sorted to create a variety of reports. The process of generating a report is shown in FIG. 4. The process begins at step 200, where the database 28 is populated with the information from the recorded events. The report generation unit 20 then sorts the information in the database 28, as shown at step 204, to create the sorted database 29. The report generation unit then places records in the sorted database 29 with the same card issuer, card number, session number, activation agent in a group, as shown at step 208. The report generation unit 20 then generates a report by card issuer as shown at step 212.

Figure 5:
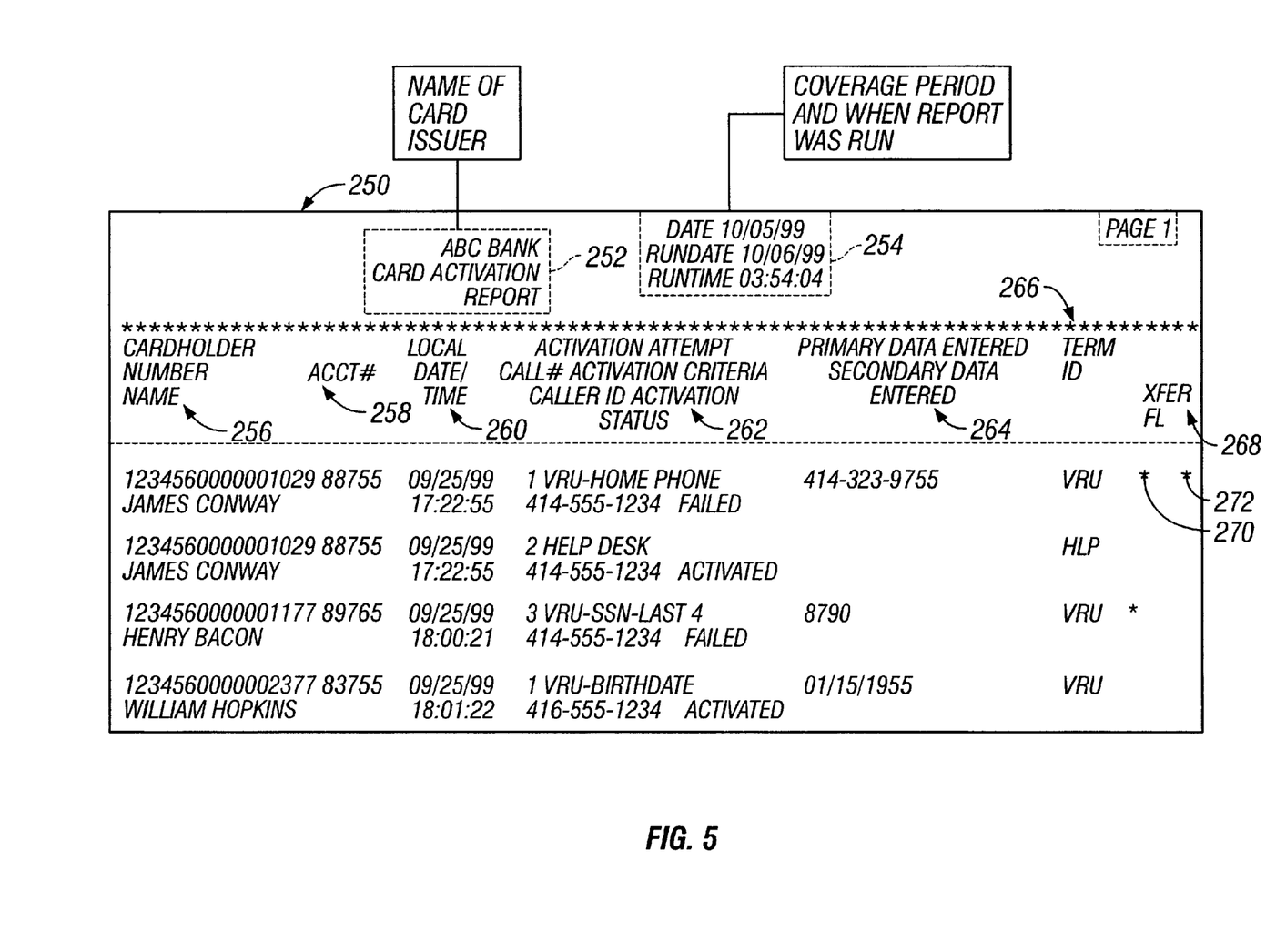
FIG. 5 is an illustration of a card activation report.
Figure 6:
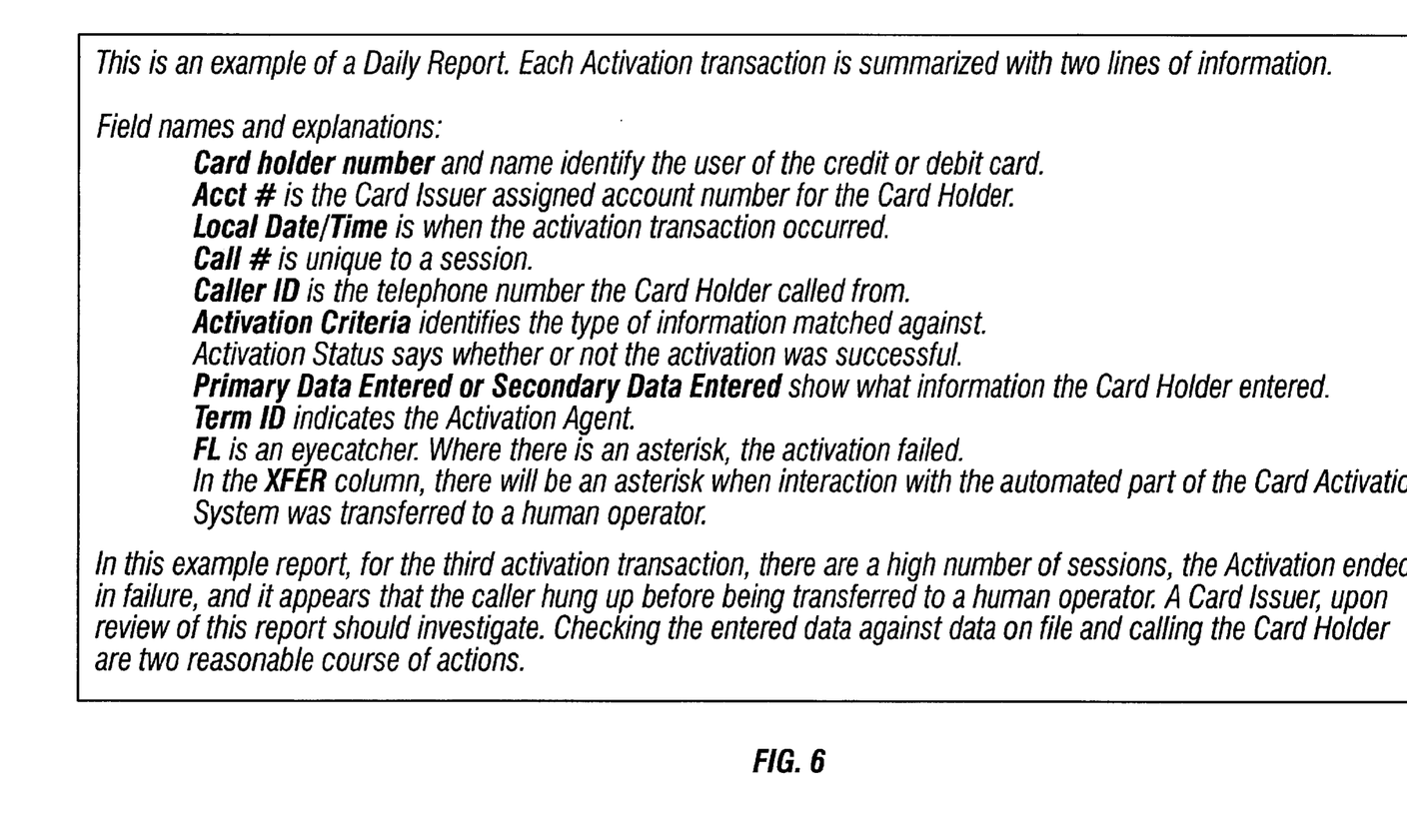
FIG. 6 is an illustration of a key for the card activation report shown in FIG. 5.

A sample report 250 is shown in FIG. 5. A key to the report 250 is shown in FIG. 6. The report 250 is a daily card activation report. The report 250 includes a card issuer name block 252 that includes the name of the issuer and an indication of the report type (e.g., daily). The report also includes a coverage period block 254 that includes information such as the date of entries in the report, the run date of the report, and the run time of the report. The information in the report is placed in seven columns. Column 256 includes the card number and cardholder name. Column 258 includes the account number the card issuer has assigned to the cardholder. Column 260 includes the data and time of the activity listed in the report. Column 262 includes a call or session number that indicates the number of times the PC has accessed the call center 14. Column 262 also includes a caller identifier such as the phone number or e-mail address of the PC. Lastly column 262 includes an indication of the activation criteria and an indication of the activation status, such as "failed" or "activated."

Column 264 includes indications of the identifying data entered by the PC. As noted above, this information may include information such as a home phone number, maiden names, social security numbers, and birth dates among others. Column 266 includes an indication of the agent that activated or processed the attempt to activate the subject card. In the examples provided, the agent is either a human operator at a help desk (code symbol "HLP") or the response unit 24 of the ACAS 10 (code symbol "VRU" for virtual response unit). Column 268 includes an eye catcher 270 that indicates a failed card activation. Column 268 also includes an indication regarding calls transferred to a help desk or CSR. Flags, such as asterisk 272, under the title XFER indicate that a PC was transferred to a human for assistance in activating the subject card.

Reports such as the report 250 may include a number of indications that the activation or attempted activation was made by an imposter rather than the actual cardholder. Indicators on the card activation report are the absolute failure eye-catcher 270, a high number of sessions for a specific card number, a high number of attempts to enter personal information and what appears to be guessed-at information (i.e., the data entered is very different from the information on file). A high number of session failures is an indicator of potentially fraudulent activity.

The report and logged records can also be used in an investigation after fraudulent use of the card has occurred. The actual cardholder ("AC") will have been asked about receipt and activation of the card. If the AC replies that either he or she did not receive the card or did not activate it, the investigator checks the card activation reports and the complete log to determine how the card was activated and the telephone number employed (ANI) by the individual that activated the card. (The telephone number used calling into an 800 number cannot be blocked.) The number recorded on the card activation report can be used to determine the location and even the identity of the alleged fraudulent card user. The details of the activation transaction(s) can be used as evidence in prosecuting the alleged fraudulent card user. This same information can be used to support or refute the cardholder's explanation of events.

One key purpose of the card activation report and summary card activation report is to inform card issuers of activation transactions for validating actual volumes with expected volumes, to reconcile invoices, to determine if selected validation criterion are the best ones to use, and for system performance monitoring. As has been stated earlier, many details and records are logged. An aspect of the invention is the reduction of that data to a meaningful presentation (i.e., one or more reports), successfully serving the primary purpose of fraud detection and prevention.

The methods described are not limited to interaction with a voice response unit. Other possibilities include communication between a cardholder and a human operator (with assistance from a computer application) and between a cardholder and a computer processor connected to the Internet. The ANI captured in implementation of the automated voice response unit method, can also be captured in an implementation of the human operator method. For the implementation of the Internet method, the capture of the network address and the electronic mail address of the cardholder provides identification information similar to the ANI for use in fraud detection and investigation.

In addition to its uses in detecting fraudulent activity, the invention may be used to facilitate cardholder customer relations. The reports generated by the system 10 may be used by card issuers to identify cardholders that are having difficulty activating their cards. In fact, in many instances failed activation attempts will occur when legitimate cardholders improperly respond to queries of the response unit 24 or have difficulty responding quickly enough to an automated system, which will often timeout if responses are not received within specific time limits. These cardholders may be contacted by the card issuer to ensure that they receive the assistance necessary to activate the card. This avoids the situation where a frustrated cardholder cancels his or her card due to an unsatisfactory experience with the system 10.

As can be seen from the above, the invention provides a method and system of monitoring card activation activity and of detecting and investigating fraudulent debit and charge card activations.

Various features and advantages of the invention are set forth in the following claims.

What is claimed is:

1. A method of activating a payment card, the method comprising
   creating a cardholder record based on information from a cardholder application, the cardholder record including card identity and cardholder information;
   receiving a card activation request;
   starting a session and issuing a first query in response to the activation request;
   receiving card identity information in response to issuing a first query;
   starting a card identity information attempt tracking mechanism;
   verifying the validity of the card identity information;
   reissuing the first query if the card identity information is invalid and a limit of the card identity tracking mechanism has not been exceeded;
   issuing an error message and ending the session if a limit of the card identity tracking mechanism has been exceeded; and
   if the card identity information is valid
      issuing a second query requesting cardholder information;
      starting a cardholder information attempt tracking mechanism;
      verifying the validity of the cardholder information;
      reissuing the second query if the cardholder information is invalid and a limit of the cardholder information attempt tracking mechanism has not been exceeded; and
      issuing an error message and ending the session if the limit of the cardholder information tracking mechanism has been exceeded; and
   if the cardholder information is valid, issuing a card activation message.

2. A method as claimed in claim 1, further comprising starting a session tracking mechanism;
   issuing an error message and ending the session if a limit of the session tracking session has been exceeded.

3. A method as claimed in claim 1, further comprising logging a first message if the card identity information is valid.

4. A method as claimed in claim 1, further comprising logging a second message if the card identity information is invalid or the limit of the card identity tracking mechanism has been exceeded.

5. A method as claimed in claim 4, further comprising logging a third message if the cardholder information is valid.

6. A method as claimed in claim 5, further comprising logging a fourth message if the cardholder information is invalid.

7. A method as claimed in claim 6, further comprising logging a fifth message if a limit of the cardholder information attempt tracking mechanism has been exceeded.

8. A method as claimed in claim 7, further comprising generating a report based on one or more of the first through fifth messages.

9. A method as claimed in claim 1, further comprising:
   before issuing a second query, querying a database;
   determining whether the card identity information matches an entry in the database;
   logging a match message if the card identity information matches an entry in the database; and
   if the card identity information does not match an entry in the database logging a non-match message.

10. A method of capturing card activation activity, the method comprising
   receiving a card activation request;
   starting a session, incrementing a session tracking mechanism; and issuing a first query in response to the activation request;
   issuing an error message and ending the session if a limit of the session tracking mechanism has been exceeded;
   receiving card identity information in response to issuing a first query;
   starting a card identity information attempt tracking mechanism;
   verifying the validity of the card identity information;
   logging a message if the card identity information is invalid;
   reissuing the first query if the card identity information is invalid and a limit of the card identity tracking mechanism has not been exceeded;

issuing an error message, logging a second message, and ending the session if a limit of the card identity tracking mechanism has been exceeded; and if the card identity information is valid
logging a third message;
issuing a second query;
starting a cardholder information attempt tracking mechanism;
verifying the validity of the cardholder information;
logging a fourth message and reissuing the second query if the cardholder information is invalid and a limit of the cardholder information attempt tracking mechanism has not been exceeded; and
logging a fifth message, issuing an error message, and ending the session if the limit of the cardholder information tracking mechanism has been exceeded.

11. A method as claimed in claim 10, further comprising logging a sixth message if the cardholder information is valid.

12. A payment card activation system comprising:
a network;
a cardholder terminal coupled to the network; and
a call center coupled to the network, the call center having
a report generation unit,
a response unit,
a cardholder database,
a set of validation rules, and
a database of logged messages, each message representing a card activation activity,
wherein the report generation unit is operable to generate a report including information based on one or more of the logged messages in the database of logged messages.

13. A system as claimed in claim 12, wherein the cardholder database includes one or more records, each record including an account number, a card number, a cardholder name, and security information.

14. A system as claimed in claim 12, wherein the network is a packet-switched network.

15. A system as claimed in claim 14, wherein the call center includes a web site.

16. A system as claimed in claim 15, wherein the cardholder terminal is an Internet appliance.

17. A system as claimed in claim 12, wherein the network is a circuit-switched network.

18. A system as claimed in claim 17, wherein the cardholder terminal is a telephone.

19. A system as claimed in claim 12, wherein the set of validation rules are set for groups of cards at a bank identification number level.

20. A payment card activation report generation system comprising
a response unit programmed to respond to an inquiry, generate card activation queries, and log messages based on responses to the queries;
a database of logged messages, each message representing a card activation activity;
a cardholder database;
a set of validation rules; and
a report generation unit programmed to sort the database of logged messages by card issuer and to generate a report including information based on one or more of the logged messages in the database of logged messages.

21. A system as claimed in claim 20, wherein the cardholder database includes one or more records, each record including an account number, a card number, a cardholder name, and security information.

22. A system as claimed in claim 21, wherein the queries generated by the response unit are based on the records in the cardholder database.

23. A system as claimed in claim 20, wherein the set of validation rules are set for groups of cards at a bank identification number level.

24. A payment card activation report comprising:
a card issue name block having a name of a card issuer;
card number and cardholder name information;
an account number;
a session number representing the number of times a purported cardholder has attempted to activate a particular card;
a purported cardholder identifier;
an indication of activation criteria;
an indication of activation status;
an indication of an agent processing an activation attempt; and
an eye catcher that indicates a failed card activation.

25. A report as claimed in claim 24, further comprising a coverage period block that includes the date of entries in the report, the run date of the report, and the run time of the report.

26. A report as claimed in claim 24, further comprising a date and a time of an activity listed in the report.

27. A report as claimed in claim 24 further comprising identifying data submitted by a purported cardholder.

28. A report as claimed in claim 24, further comprising an indication representing whether a request for card activation made by a purported cardholder was transferred to a human being for processing.

29. A method of monitoring card activation activity, the method comprising
logging activity of a purported cardholder in activating a payment card, where the impetus of activity is one or more queries generated by a response unit;
creating a report from the logged activity; and
reviewing the report for indications of failed activation, erroneous responses to queries, or both.

30. A method as claimed in claim 29, further comprising reviewing the report for activation failure eye catchers.

31. A method as claimed in claim 29, further comprising reviewing a number of sessions amount in the report.

32. A method as claimed in claim 29, further comprising:
creating a database of actual cardholders;
reviewing the report for an indication of activation success;
determining a card associated with the activation success;
contacting the actual cardholder of the card; and
determining whether the actual cardholder is aware that the card has been activated.

33. A method as claimed in claim 32, further comprising determining identifying information of a purported cardholder associated with the activation success; and
contacting the purported cardholder if the actual cardholder is unaware that the card has been activated.

* * * * *